(12) United States Patent
Chapman et al.

(10) Patent No.: US 10,452,964 B1
(45) Date of Patent: Oct. 22, 2019

(54) HIDDEN BAR CODE SYSTEM VIA VECTOR PATTERN CORRELATION MARKS

(71) Applicant: Xerox Corporation, Norwalk, CT (US)

(72) Inventors: Edward N. Chapman, Rochester, NY (US); George A. Gibson, Fairport, NY (US); Paul Roberts Conlon, South Bristol, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/118,745

(22) Filed: Aug. 31, 2018

(51) Int. Cl.
G06K 19/06 (2006.01)
G06T 3/60 (2006.01)
G06T 3/00 (2006.01)

(52) U.S. Cl.
CPC . *G06K 19/06037* (2013.01); *G06K 19/06046* (2013.01); *G06T 3/0006* (2013.01); *G06T 3/608* (2013.01)

(58) Field of Classification Search
CPC ........ G06K 19/06037; G06K 19/06046; G06T 3/0006
USPC ................................................. 235/494, 487
See application file for complete search history.

(56) References Cited

U.S. PATENT DOCUMENTS

| 5,734,752 | A | 3/1998 | Knox | |
| 6,252,971 | B1* | 6/2001 | Wang | G06T 1/0021 |
| | | | | 382/100 |
| 7,032,823 | B2 | 4/2006 | Nojiri | |
| 7,894,626 | B2 | 2/2011 | Wang et al. | |
| 9,471,846 | B2* | 10/2016 | Fan | G06K 9/00577 |
| 9,614,995 | B1* | 4/2017 | Chapman | H04N 1/32309 |
| 10,009,503 | B1 | 6/2018 | Chapman | |
| 2006/0157574 | A1* | 7/2006 | Farrar | G06F 21/608 |
| | | | | 235/494 |
| 2009/0060258 | A1* | 3/2009 | Wang | G06T 1/0021 |
| | | | | 382/100 |
| 2013/0153657 | A1 | 6/2013 | Loughrey et al. | |
| 2016/0127603 | A1* | 5/2016 | Chapman | H04N 1/32331 |
| | | | | 283/85 |
| 2016/0132984 | A1* | 5/2016 | Fan | G06K 9/00577 |
| | | | | 382/100 |

\* cited by examiner

*Primary Examiner* — Paultep Savusdiphol
(74) *Attorney, Agent, or Firm* — Fox Rothschild LLP

(57) ABSTRACT

A system generates a secure barcode and prints the secure barcode on a substrate. The barcode includes a first set of cells of a first color and a second set of cells of the second color. A first vector pattern is encoded onto pixels for first set of cells of the barcode, and a second vector pattern is encoded onto pixels that correspond to the set group of cells of the barcode. The vectors in each pattern will have substantially the same colors, thicknesses and frequencies, but will be out of phase with respect to each other. The system will generate a secure barcode that vectors of each pattern.

23 Claims, 6 Drawing Sheets

HIDDEN BAR CODE SYSTEM VIA VECTOR PATTERN CORRELATION MARKS

BACKGROUND

Security is an important requirement in many printing applications. In situations such as official or government document printing, event ticket printing, financial instrument printing and the like, many printed materials must be protected against copying, forging and/or counterfeiting.

In some situations, document creators may wish to encode a security mark in a document in a way that is invisible to the human eye, but which can be detected by optical character recognition (OCR) systems. An example is printing of a hospital security bracelet, where it may not be desirable to make personal information visible. However, existing methods of encoding security marks onto printed materials exhibit various technical limitations. Invisible inks can be used, but they are expensive to apply and can degrade over time. In addition, the technical capabilities of various OCR systems can vary, so not all printed security marks can be read by various OCR systems.

This document describes methods and systems for creating and using a document with a security mark that addresses at least some of the problems described above, and/or other problems.

SUMMARY

In various embodiments, a system generates a secure barcode and prints the secure barcode on a substrate. To do this, a print server may receive or generate a barcode to be printed on a substrate, in which the barcode includes a first set of cells of a first color and a second set of cells of the second color. The print server will encode a first vector pattern of a correlation mark template onto pixels that correspond to the first set of cells of the barcode, and it will encode a second vector pattern of the correlation mark template onto pixels that correspond to the second set of cells of the barcode. The vector patterns will have substantially the same colors, line thicknesses and frequencies, but will be out of phase with respect to each other. The system will generate a secure barcode that includes the pixels that correspond to the first set of cells having the first vector pattern and the pixels that correspond to the second set of cells having the second vector pattern. The system will then generate an electronic document file that includes data for printing the secure barcode on a substrate.

The system may provide the electronic document file to a print engine. The print engine may use the electronic document file to print a document with the secure barcode on the substrate by printing the pixels that correspond to the first set of cells with the first vector pattern, and by printing the pixels that correspond to the second set of cells with the second vector pattern.

In some embodiments, when encoding the first vector pattern onto the pixels that correspond to the first set of cells, the system may encode the first vector pattern onto all pixels of the mark. Then, when generating the secure barcode, for the pixels that correspond to the second set of cells, the system may replace the first vector pattern with the second vector pattern. Alternatively, when encoding the first vector pattern onto the pixels that correspond to the first set of cells, the system may encode the first vector pattern onto only pixels of the mark that correspond to the second set of cells.

When encoding the first vector pattern onto the pixels that correspond to the first set of cells and encoding the second vector pattern onto the pixels that correspond to the second set of cells, the system may generate, for each of the vector patterns, vectors that have substantially the same color, thickness and frequency.

In various embodiments, the phase that is shifted with respect to a phase of the first vector pattern may include a frequency shift. In addition or alternatively, the phase that is shifted with respect to a phase of the first vector pattern may include an angular phase shift.

The system also may include a camera, and a processor that implements a barcode analysis system that receives an image of the document from the camera, extracts the secure barcode from the image, generates a binary barcode that corresponds to the secure barcode as extracted from the image, and decodes the binary barcode. In some embodiments, generating the binary barcode may include converting cells that correspond to the first phase to a first color, and also converting cells that correspond to the second phase to a second color. In some embodiments, when extracting the secure barcode from the image, the barcode analysis system may correct the image for skew, lighting or perspective distortion.

To extract the secure barcode from the image, the barcode analysis system may process the image to identify cells that correspond to a first phase as those having the first vector pattern; and it may identify cells that correspond to a second phase as those having the first vector pattern. Alternatively, to extract the secure barcode from the image the barcode analysis system may using a key that includes a known phase shift.

DETAILED DESCRIPTION

Figure 1:
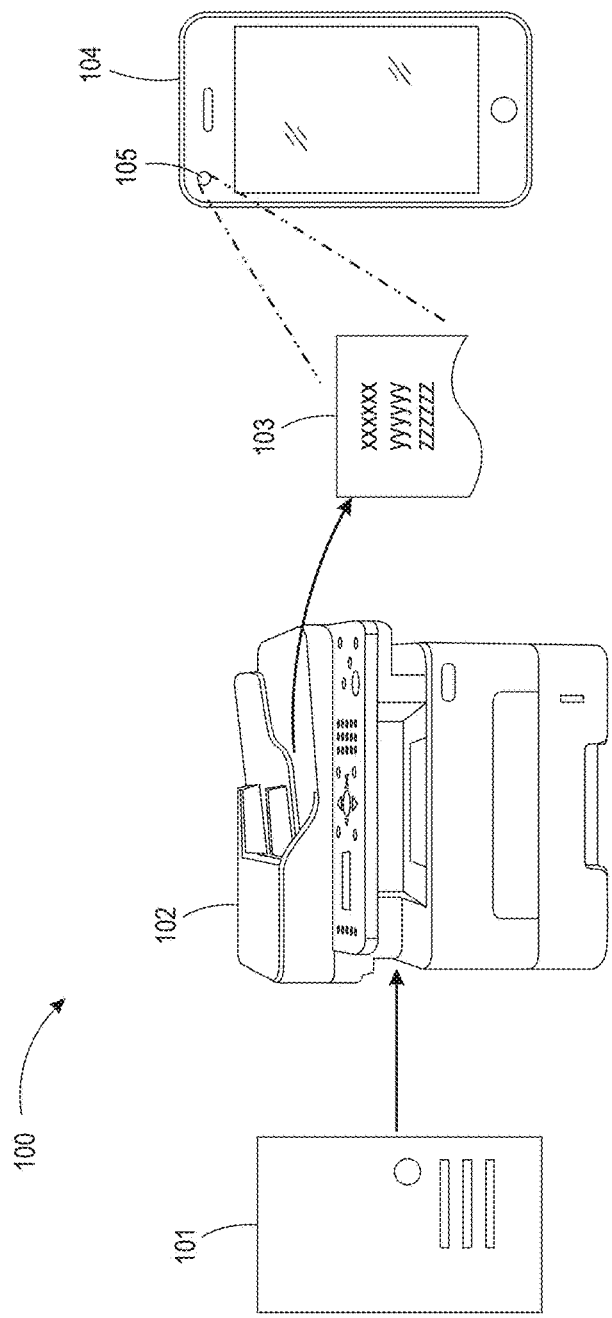
FIG. 1 illustrates example components of a system for generating and printing a secure barcode on a substrate, and also for decoding the barcode after it is printed on the substrate.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

In this disclosure, the term "barcode" refers to a pattern or symbol that contains encoded data. Barcodes may include, for example, one-dimensional barcodes, two-dimensional barcodes such as matrix codes, Quick Response ("QR") codes, Aztec codes and the like, or three-dimensional barcodes.

In this disclosure, the term "document" refers to any substrate onto which content is or has been printed. The content may be printed on the substrate using toner and/or ink. The document may, for example, include one or more areas comprising characters, and/or one or more other areas comprising images.

The terms "computing device" and "electronic device" interchangeably refer to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera for capturing images. An electronic device also may include one or more communication hardware components such as a transmitter and/or receiver that will enable the device to send and/or receive signals to and/or from other devices, whether via a communications network or via near-field or short-range communication protocols. If so, the programming instructions may be stored on the remote device and executed on the processor of the computing device as in a thin client or Internet of Things (IoT) arrangement. Example components of an electronic device are discussed below in the context of FIG. 6. An electronic device that is programmed to generate an electronic file of a document to be printed may be referred to as a "print server."

The terms "memory," "memory device," "computer-readable medium" and "data store" each refer to a non-transitory device on which computer-readable data, programming instructions or both are stored. Unless the context specifically states that a single device is required or that multiple devices are required, the terms "memory," "memory device," "computer-readable medium" and "data store" include both the singular and plural embodiments, as well as portions of such devices such as memory sectors.

The term "pixel" is intended to have its common meaning as an element of a digital image. A pixel represents the basic unit of programmable color that may be displayed on a digital display device and/or printed on a substrate. Each pixel typically has a location and a color value. Each pixel value may be a bit in a binary (two-color) form of an image, a gray scale value in a gray scale form of an image, or a set of color space coordinates in a color coordinate form of an image.

A "print device" or "print engine" is a device that is configured to print a document based on digital data, or a multi-functional device in which one of the functions is printing based on digital data. Example components of a print device include a print head, which may include components such as a print cartridge or reservoir containing ink, toner or another print material, as well as a document feeding system configured to pass a substrate through the print device so that the print head can print characters and/or images on the substrate.

A "processor" or "processing device" is a hardware component of an electronic device that is configured to execute programming instructions. The term "processor" may refer to a single processor or to multiple processors that together implement various steps of a process. Unless the context specifically states that a single processor is required or that multiple processors are required, the term "processor" includes both the singular and plural embodiments.

FIG. 1 illustrates example components of a system 100 for generating and printing a document having a secure barcode, as well as for decoding the document after it is printed. Referring to FIG. 1, a first electronic device 101 may serve as a print server, as it will implement programming instructions that cause it to generate an electronic document file that includes instructions for printing a document with a secure barcode onto a substrate. The print server, on its own to together with another electronic device in communication with the print server, or the other electronic device may include memory containing various programming instruction sets that perform various functions. This document may refer to such a group of programming instructions as a "module."

The print server / electronic device 101 may transfer the electronic document file to a print device 102, which will print the electronic document file contents onto a substrate to yield a printed document 103. A second electronic device 104 having a camera 105 and optionally an installed barcode scanning application may capture an image of the printed document and process the image to identify and decode the secure barcode. The second electronic device 104 itself may serve as a self-contained barcode analysis system, or the second electronic device 104 may transmit the image to a remote service, in which case the second electronic device 104 and/or the remote service may be components of the barcode analysis system.

In the process described below, the print server and/or print device may perform a dynamic pattern generation process to provide security features to generate the barcode that is printed on the substrate so that the barcode is a variable data barcode that is not visible to the human eye, but which may be detected by a barcode scanning application without the need to place a pattern mask over the printed document. To do this, the system create a pattern color space that incorporates specialty imaging features using standard page description language constructs, such as PostScript™ constructs. The pattern color space can be selected as a color for a color parameter for an object (e.g., lines, text, geometric shapes, freeform shapes, etc.) or an object characteristic (e.g., line color, fill color, foreground color, background color, etc.) in the document.

Rather than defining the specific string to be rendered at a specified location on the page, a specialty imaging string may be used to define a dynamically created pattern ink. This pattern ink is subsequently accessible by other page description language drawing and rendering commands through selection as a color parameter in the command. This may be done by printing the barcode as a vector pattern correlation mark.

To understand the term "vector pattern correlation mark," we first address the phrase "correlation mark." A "correlation mark" is a type of security mark that includes one or more elements that are invisible or hardly visible on a printed document. The hidden elements become visible to the human eye when the document is viewed through a correlation mask (i.e., a screen) that serves as a "key" to the correlation mark. When copying or scanning a document having a correlation mark, the correlation mark can survive and can still be decoded in the resulting copy.

A "vector pattern correlation mark" is a type of correlation mark in which an image is printed in two layers (or as two components of a single layer), each layer/component has substantially the same vector pattern, but the vector patterns of the two layers/components are not in phase with each other. For example, the vector pattern of the second layer/component may be rotated approximately +90 or −90 degrees with respect to the vector pattern of the first layer/component. In this situation, the vector patterns of the two layers or components also may be referred to as "orthogonal" (i.e., an affine rotation). Alternatively, the vector pattern of the second layer/component may have the same angle with respect to the vector pattern of the first layer/component, but with a position that is shifted (i.e., an affine translation) with respect to that of the first pattern. An example of this will be described below.

Figure 2A:
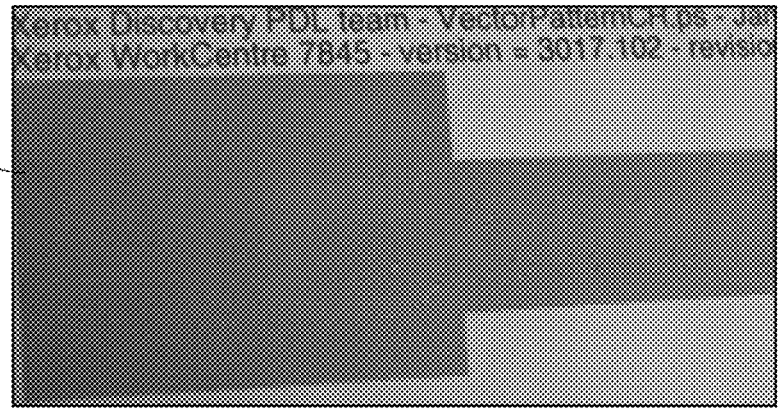
FIGS. 2A and 2B illustrate example correlation marks according to the prior art.
Figure 2B:
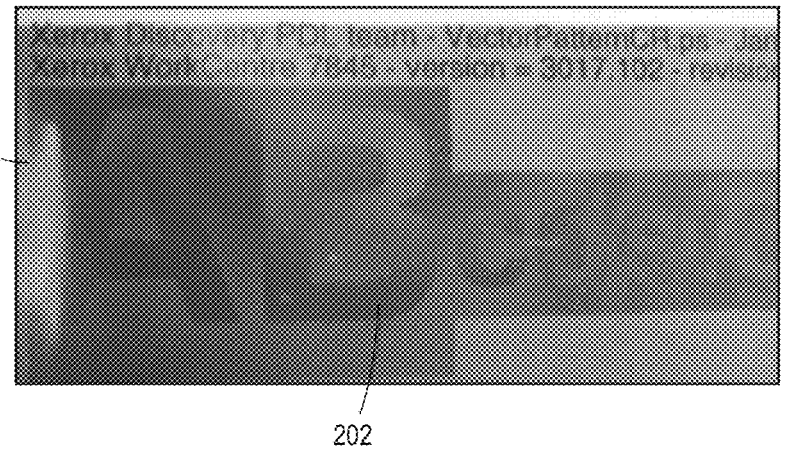

An example of a vector pattern correlation mark of the prior art is shown in FIGS. 2A and 2B. FIG. 2A shows that a correlation mark 201 without a mask placed over it, while FIG. 2B shows the mark after a mask has been placed over the mark, revealing the secure content 202 within the correlation mark 201.

Figure 3:
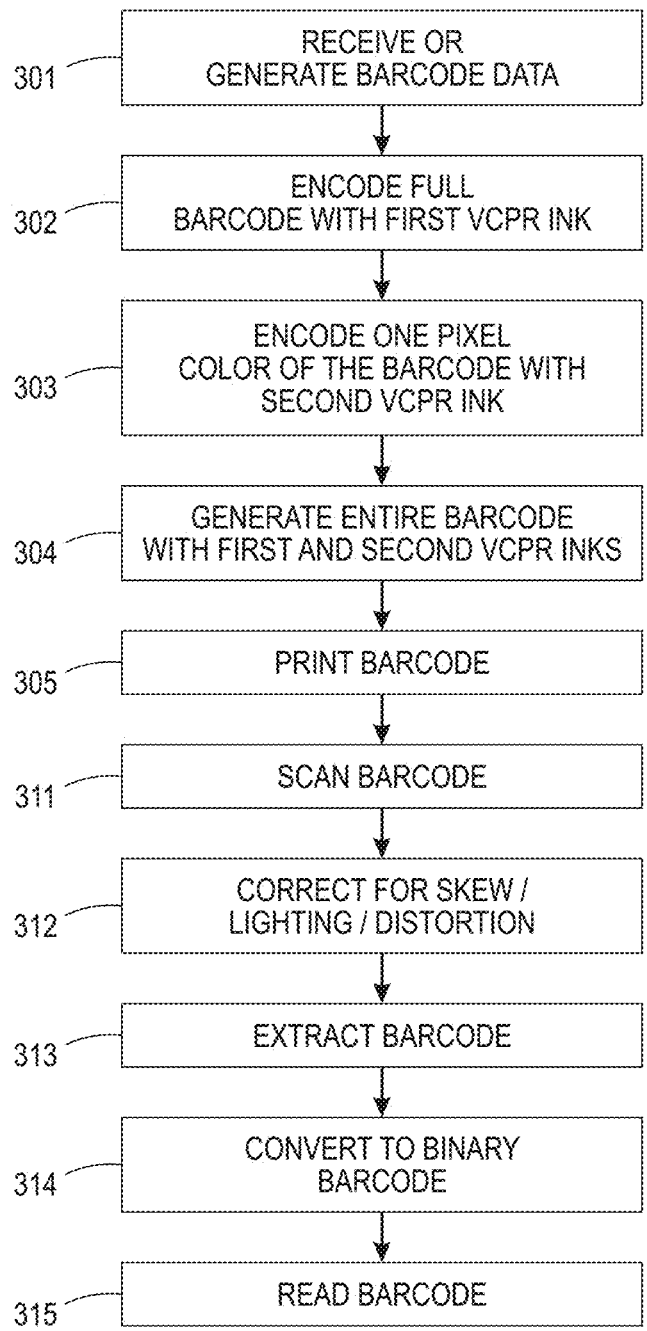
FIG. 3 is a flowchart illustrating an example process of generating and document containing a secure barcode, and also for scanning the document to read and decode the secure barcode.
Figure 4A:
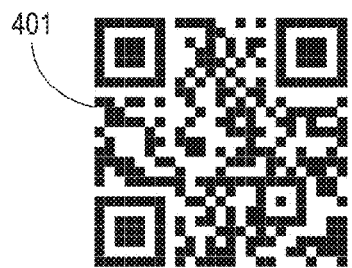
FIGS. 4A-4D illustrate example components of a secure barcode.

This document discloses a method of printing a secure barcode, such as a two-dimensional barcode, as a vector pattern correlation mark. Referring to the process of FIG. 3 and the example components of FIGS. 4A-4D, the system will include a barcode generation module with instructions that cause the system to receive or generate barcode data that includes encoded data to be printed on a substrate as a barcode (step 301). An example of such a barcode, in the form of a QR code 401, is shown in FIG. 4A.

Figure 4B:
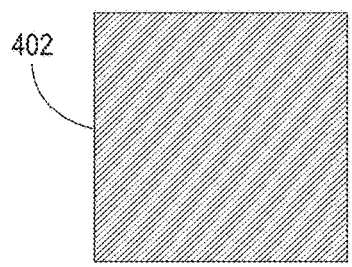

The system may include a vector pattern correlation mark generation module with instructions to encode at least the entire pixel set corresponding to the barcode (e.g., at least the entire QR code square) with a first ink of the vector pattern correlation mark (step 302) according to a first vector pattern. In this way, a first layer includes the first vector pattern. Alternatively, the module may cause the system to encode pixels corresponding to a first group of barcode cells with the first vector pattern, in which case the mark may have a single layer and the first group will be the first component of the layer. The first vector pattern ink will be of any color (referred to in this document as a first color), and the first vector pattern will include a defined frequency of lines (vectors) having a specified thickness, and a specified angle with respect to an x-axis or y-axis of the mark. An example of this encoding 402 is shown in FIG. 4B. Although the size of the images that can provided in this document does not make the individual vectors visible, if one were to zoom in with significant magnification it would become apparent that this encoding 402 is a square that is filled by a set of parallel lines positioned at a 45 degree angle with respect to the x-axis of the mark, with white space between the lines determined by the specified frequency. The thickness of the vectors used in each layer may be consistent across the layer, and in some embodiments a very thin thickness—such as the thinnest possible thickness (e.g., one pixel)—may be used. The frequency of the vectors also may be consistent across the later. A standard frequency of approximately 75 lines per inch (lpi) may be used, as such a frequency is commonly used with correlation marks that are decoded with a screen or key. However, the embodiments of this document are not limited to any particular frequency, and any or another frequency may be used that results in an image having a satisfactory image quality for the particular application.

The barcode will include any number of cells. In a binary barcode, each cell will have either a first color (e.g., black) or a second color (e.g., white). When printed, each cell will be formed by printing a set of adjacent pixels. The system will also encode a pixel subset that includes barcode cells corresponding to one of the colors of the barcode (typically the black pixels, but also optionally and alternatively the white pixels) with a second pattern ink (step 303). In other words, these pixels will be printed with a second vector pattern.

The second vector pattern will be of substantially the same color as the first vector pattern (with "substantially" meaning not visibly discernable to the unaided human eye). In addition, the second vector pattern will have substantially the same frequency and thickness as the first vector pattern, but it will be out of phase with the first vector pattern in that either (a) the vectors of the second ink will be shifted with respect to the first ink (i.e., an affine translation will exist), or (b) the second vector pattern will be printed at a different angle with respect to the x-axis or y-axis of the mark than the angle of the first vector pattern (i.e., an affine rotation will exist).

Figure 5A:
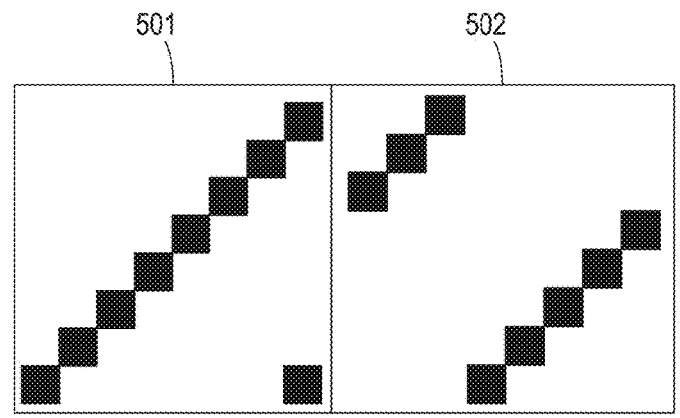
FIGS. 5A and 5B illustrate examples of vector pattern phase shifts.

When an affine translation is used to accomplish the phase shift, the second ink vectors may be shifted in position, as shown for example in FIG. 5A, in which pixels within a second cell 502 have lines in which the pattern is shifted in position as compared to the lines of the first cell 501, so that at least one vector of the second cell is positioned substantially midway between two vectors of the first cell. (In FIG. 5A the cells are shown with border lines to help distinguish them for purpose of this illustration, but in practice the border lines typically would not be used in a printed document.)

Figure 5B:
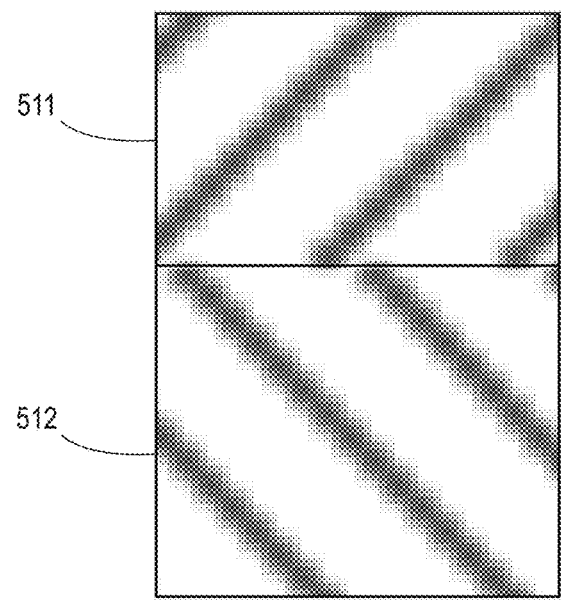

When affine rotation is used for the phase shift, the angle of the vectors of the second pattern may be approximately +90 degrees or −90 degrees different from the vectors of the first pattern (i.e., the patterns may be orthogonal) as shown in the close-up of a segment of a barcode cells 511 and 512 shown in FIG. 5B). As an alternative to the +/−90 degree angles shown in FIG. 5B, any angles that place the two patterns out of phase with each other may be used.

Figure 4C:
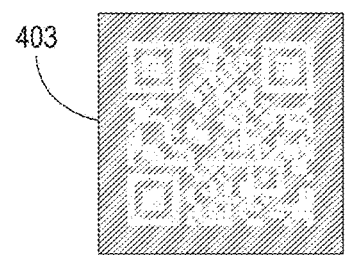

An example of a resulting encoding 403 is shown in FIG. 4C. Although the size of the images that can provided in FIGS. 4A-4C does not make the individual vectors visible to the unaided eye, if one were to zoom in with significant magnification it may become apparent that the vectors of mark 403 are out of phase with those of mark 402.

The system will then generate the vector pattern correlation ink barcode (step 304) such that the pixels that are included in the pixel subset will be printed with the second vector pattern ink, and the remaining pixels in the mark will be printed with the first vector pattern ink. This may be done in two layers, with the first vector pattern being the first layer and the second vector pattern being the second layer. Or, it may be a single layer with each vector pattern being used for corresponding components of the single layer. The barcode generation module may then save the barcode into an electronic document file. The electronic document file will then be provided to a print device, which will print the vector pattern correlation ink barcode on a substrate (step 305).

Figure 4D:
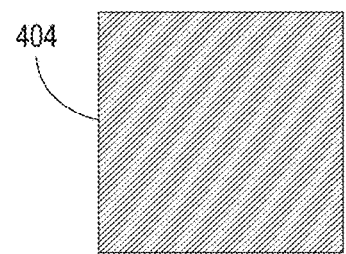

An example of the resulting mark 404 is shown in FIG. 4D. To the unaided human eye, mark 404 is not visibly different from mark 402. All vectors in each of marks 402 and 404 have substantially the same line thickness, color and frequency. However, in mark 402 all vectors of the mark have the same phase, while in mark 404 the vectors have two phases: one for pixels corresponding to the first color of the barcode (e.g., black or white), and the other for pixels corresponding to the second color of the barcode (e.g., the other of black or white).

Returning to FIG. 3, to decode the printed barcode, an electronic device with a camera and a barcode scanning application will scan the barcode 311 by taking an image of the document. The scanning may be done by a standard barcode scanning application (in which case the image of the barcode may be passed to an image processing module to perform the analysis described in this document), a proprietary application that includes image processing steps described in this document, or any image capturing software. The electronic device may then analyze the image to extract the barcode from the image, or the electronic device may transmit an electronic image file to a remote service for the extraction process. The extraction process may include correcting the image for skew, lighting and/or perspective distortion (step 312) using any suitable image processing procedures now or hereafter known, and extracting the barcode from the image (step 313).

To extract the barcode from the image (step 313), the system may identify the printed vector pattern correlation mark that includes the hidden barcode (as in FIG. 4D) use a key that includes a known phase shift (i.e., based on frequency or angular shift as described above), processing the mark to identify cells that correspond to a first phase and cells that correspond to a second phase. Alternatively, rather than using a key the system may process the image to identify the vector shift, and then look for cells that correspond to the first phase and cells that correspond to the second phase. The system will convert cells that correspond to the first phase to a first color (e.g., black), and it will convert cells that correspond to the second phase to a second color (e.g., white). The system will thus convert the cells to a solid pattern instead of a vector pattern to yield a binary barcode (step 314), and it will decode the barcode (step 315), either on its own or with a separate barcode reading application, using any barcode decoding process that is or that may be known to those of skill in the art, to yield a barcode such as that shown in FIG. 4A.

Figure 6:
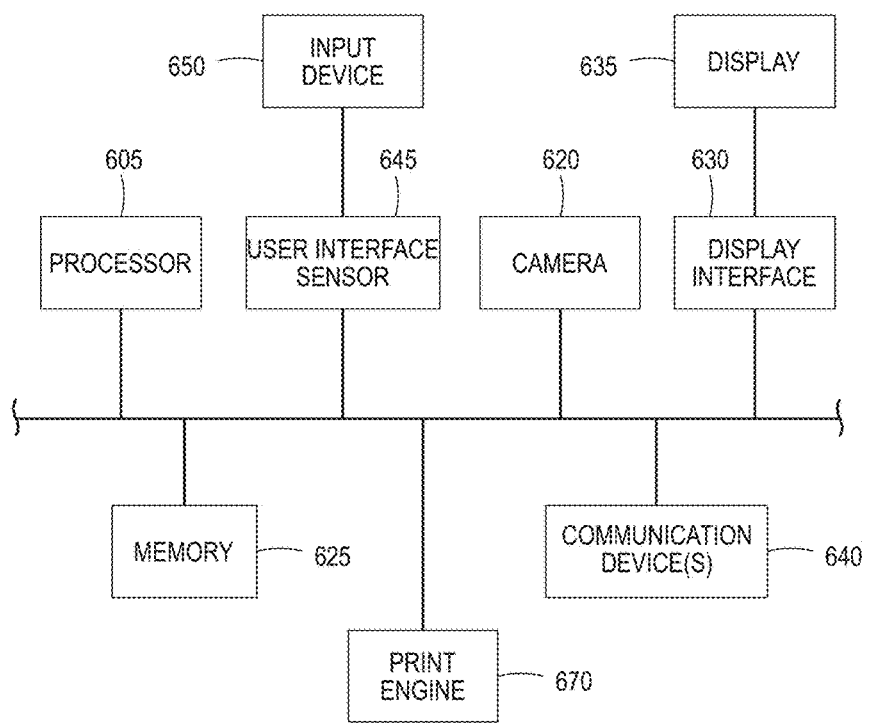
FIG. 6 is a block diagram showing various equipment that may be used to implement various embodiments of the processes described in this document.

FIG. 6 depicts an example of internal hardware that may be included in any of the electronic components of the system, such as a print device having a processing capability, or a local or remote computing device that is in communication with the print device, or a barcode scanning device. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625 that may store the programming instructions. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 630 may permit information from the bus 600 to be displayed on a display device 635 in visual, graphic or alphanumeric format. An audio interface and audio output (such as a speaker) also may be provided. Communication with external devices may occur using various communication devices 640 such as a wireless antenna, an RFID tag and/or short-range or near-field communication transceiver, each of which may optionally communicatively connect with other components of the device via one or more communication system. The communication device(s) 640 may be configured to be communicatively connected to a communications network, such as the Internet, a local area network or a cellular telephone data network.

The hardware may also include a user interface sensor 645 that allows for receipt of data from input devices 650 such as a keyboard, a mouse, a joystick, a touchscreen, a touch pad, a remote control, a pointing device and/or microphone. In embodiments where the electronic device is the smartphone or another image capturing device, digital images of a document or other image content may be acquired via a camera 620 that can capture video and/or still images. In embodiments where the electronic device includes a print device, the print device may include a print engine 670 with components such as a print head, document feeding system and other components typically used in print devices.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of generating a document having a secure barcode, the method comprising:
   by a processing device:
      receiving or generating a barcode to be printed on a substrate, in which the barcode includes a first set of cells of a first color and a second set of cells of the second color, wherein each of the cells corresponds to a plurality of pixels,
      encoding a first vector pattern onto the pixels that correspond to the first set of cells,
      encoding a second vector pattern onto the pixels that correspond to the second set of cells, wherein the second vector pattern has a phase that is shifted with respect to a phase of the first vector pattern,
      generating a secure barcode that comprises:
         the pixels that correspond to the first set of cells having the first vector pattern; and
         the pixels that correspond to the second set of cells having the second vector pattern,
      generating an electronic document file comprising data for printing the secure barcode on a substrate, and
      providing the electronic document file to a print engine; and
   by the print engine, using the electronic document file to print a document comprising the secure barcode on the substrate by printing the pixels that correspond to the first set of cells with the first vector pattern, and by printing the pixels that correspond to the second set of cells with the second vector pattern.

2. The method of claim 1, wherein:
- encoding the first vector pattern onto the pixels that correspond to the first set of cells comprises encoding the first vector pattern onto all pixels of the mark; and
- generating the secure barcode comprises, for the pixels that correspond to the second set of cells, replacing the first vector pattern with the second vector pattern.

3. The method of claim 1, wherein encoding the first vector pattern onto the pixels that correspond to the first set of cells comprises encoding the first vector pattern onto only pixels of the mark that correspond to the second set of cells.

4. The method of claim 1, wherein encoding the first vector pattern onto the pixels that correspond to the first set of cells and encoding the second vector pattern onto the pixels that correspond to the second set of cells comprises generating, for each of the vector patterns, vectors that have substantially the same color, thickness and frequency.

5. The method of claim 1, wherein the phase that is shifted with respect to a phase of the first vector pattern comprises an affine translation to the second vector pattern.

6. The method of claim 1, wherein the phase that is shifted with respect to a phase of the first vector pattern comprises affine rotation to the second vector pattern.

7. The method of claim 1, further comprising, by a barcode analysis system:
- receiving an image of the document;
- extracting the secure barcode from the image;
- generating a binary barcode that corresponds to the secure barcode as extracted from the image; and
- decoding the binary barcode.

8. The method of claim 7, wherein extracting the secure barcode from the image comprises correcting the image for skew, lighting or perspective distortion.

9. The method of claim 7, wherein extracting the secure barcode from the image comprises:
- processing the image to identify cells that correspond to a first phase as those having the first vector pattern; and
- identifying cells that correspond to a second phase as those having the first vector pattern.

10. The method of claim 9, wherein extracting the secure barcode from the image comprises using a key that includes a known phase shift.

11. The method of claim 9, wherein generating the binary barcode comprises:
- converting cells that correspond to the first phase to a first color; and
- converting cells that correspond to the second phase to a second color.

12. A system for generating a document having a secure barcode, the system comprising:
- a processor; and
- a memory device in communication with the processor, the memory device containing programming instructions that are configured to cause the processor to generate secure barcode, the programming instructions comprising:
  - a barcode generation module comprising instructions to receive or generate a barcode to be printed on a substrate, in which the barcode includes a first set of cells of a first color and a second set of cells of the second color, wherein each of the cells corresponds to a plurality of pixels, and
  - a vector pattern correlation mark generation module comprising programming instructions to:
    - encode a first vector pattern onto the pixels that correspond to the first set of cells;
    - encode a second vector pattern onto the pixels that correspond to the second set of cells, wherein the second vector pattern has a phase that is shifted with respect to a phase of the first vector pattern,
  wherein:
    - the barcode generation module further comprises programming instructions to generate a secure barcode that comprises:
      - the pixels that correspond to the first set of cells having the first vector pattern, and
      - the pixels that correspond to the second set of cells having the second vector pattern; and
    - the system further comprises a document generation module comprising programming instructions to generate an electronic document file comprising data for printing the secure barcode on a substrate.

13. The system of claim 12, wherein:
- the programming instructions to encode the first vector pattern onto the pixels that correspond to the first set of cells comprise instructions to encode the first vector pattern onto all pixels of the mark; and
- the programming instructions to generate the secure barcode comprise instructions to, for the pixels that correspond to the second set of cells, replace the first vector pattern with the second vector pattern.

14. The system of claim 12, wherein the programming instructions to encode the first vector pattern onto the pixels that correspond to the first set of cells comprise instructions to encode the first vector pattern onto only pixels of the mark that correspond to the second set of cells.

15. The system of claim 12, wherein the programming instructions to encode the first vector pattern onto the pixels that correspond to the first set of cells and encode the second vector pattern onto the pixels that correspond to the second set of cells comprise instructions to generate, for each of the vector patterns, vectors that have substantially the same color, thickness and frequency.

16. The system of claim 12, wherein the instructions to encode the phase that is shifted with respect to a phase of the first vector pattern comprise instructions to apply an affine translation to the second vector pattern.

17. The system of claim 12, wherein the instructions to encode the phase that is shifted with respect to a phase of the first vector pattern comprise instructions to apply an affine rotation to the second vector pattern.

18. The system of claim 12, further comprising:
- a camera; and
- programming instructions for a barcode analysis module that are configured to cause a processor to:
  - receive, from the camera, an image the substrate with the secure barcode,
  - extract the secure barcode from the image,
  - generate a binary barcode that corresponds to the secure barcode that is extracted from the image, and
  - decode the binary barcode.

19. The system of claim 18, wherein the programming instructions to extract the secure barcode from the image comprise instructions to correct the image for skew, lighting or perspective distortion.

20. The system of claim 19, wherein the programming instructions to extract the secure barcode from the image comprise instructions to process the image to:
- identify cells that correspond to a first phase as those having the first vector pattern; and
- identify cells that correspond to a second phase as those having the first vector pattern.

21. The system of claim 20, wherein the programming instructions to extract the barcode from the image comprise instructions to use a key that includes a known phase shift.

22. The system of claim 18, wherein the programming instructions to generate the binary barcode comprise instructions to:
- convert cells that correspond to the first phase to a first color; and
- convert cells that correspond to the second phase to a second color.

23. The system of claim 12, further comprising a print engine that is configured to use the electronic document file to print a document comprising the secure barcode on the substrate by printing the pixels that correspond to the first set of cells with the first vector pattern, and by printing the pixels that correspond to the second set of cells with the second vector pattern.

* * * * *